United States Patent [19]

Anderson

[11] Patent Number: 4,498,576
[45] Date of Patent: Feb. 12, 1985

[54] PRODUCT CONVEYOR LANE DIVIDER

[76] Inventor: Vernon J. Anderson, 3404 Iowa St., Alexandria, Minn. 56308

[21] Appl. No.: 371,002

[22] Filed: Apr. 22, 1982

[51] Int. Cl.³ .................................................. B65G 47/26
[52] U.S. Cl. ..................................... 198/426; 198/441
[58] Field of Search ............... 198/441, 426, 436, 438, 198/440, 434, 427, 457

[56] References Cited

U.S. PATENT DOCUMENTS

| | | | |
|---|---|---|---|
| 1,945,090 | 1/1934 | Smith | 198/457 |
| 1,997,532 | 4/1935 | Molins | 198/441 |
| 2,010,486 | 8/1935 | Herrmann | 198/457 |
| 2,872,017 | 2/1959 | Anderson et al. | 198/441 |
| 3,176,821 | 4/1965 | Eldred et al. | 198/426 |
| 3,250,372 | 5/1966 | Wagner et al. | 198/440 |
| 3,605,980 | 9/1971 | Donahue et al. | 198/457 |

FOREIGN PATENT DOCUMENTS 581773 7/1933 Fed. Rep. of Germany ...... 198/436

Primary Examiner—Joseph E. Valenza
Assistant Examiner—Daniel R. Alexander
Attorney, Agent, or Firm—Clarence A. O'Brien; Harvey B. Jacobson

[57] ABSTRACT

A product conveyor lane divider for dividing cartons, tubs, jars, boxes and various products from a single infeed product lane into two product discharge lanes. The product infeed lane feeds products onto a work or separator conveyor in single file and a driven divider wheel having lugs or separating members disposed thereon engages every other product or group of products and moves it laterally on the separator conveyor for discharge onto a product discharge conveyor which discharges the two lanes of products formed by displacement caused by the divider wheel. Apparatus is included that adjusts the divider wheel to selected various heights and an angle drive mechanism is provided for driving the wheel. The speed, angle and spacing of the lugs may be adjusted to satisfy installation requirements. In one embodiment, the infeed lane is provided with a separator having a helical flight paralleling the lane and including a tapering flight to engage cylindrical products in the single lane and moving them into spaced relation.

12 Claims, 7 Drawing Figures

U.S. Patent   Feb. 12, 1985   Sheet 1 of 3   4,498,576
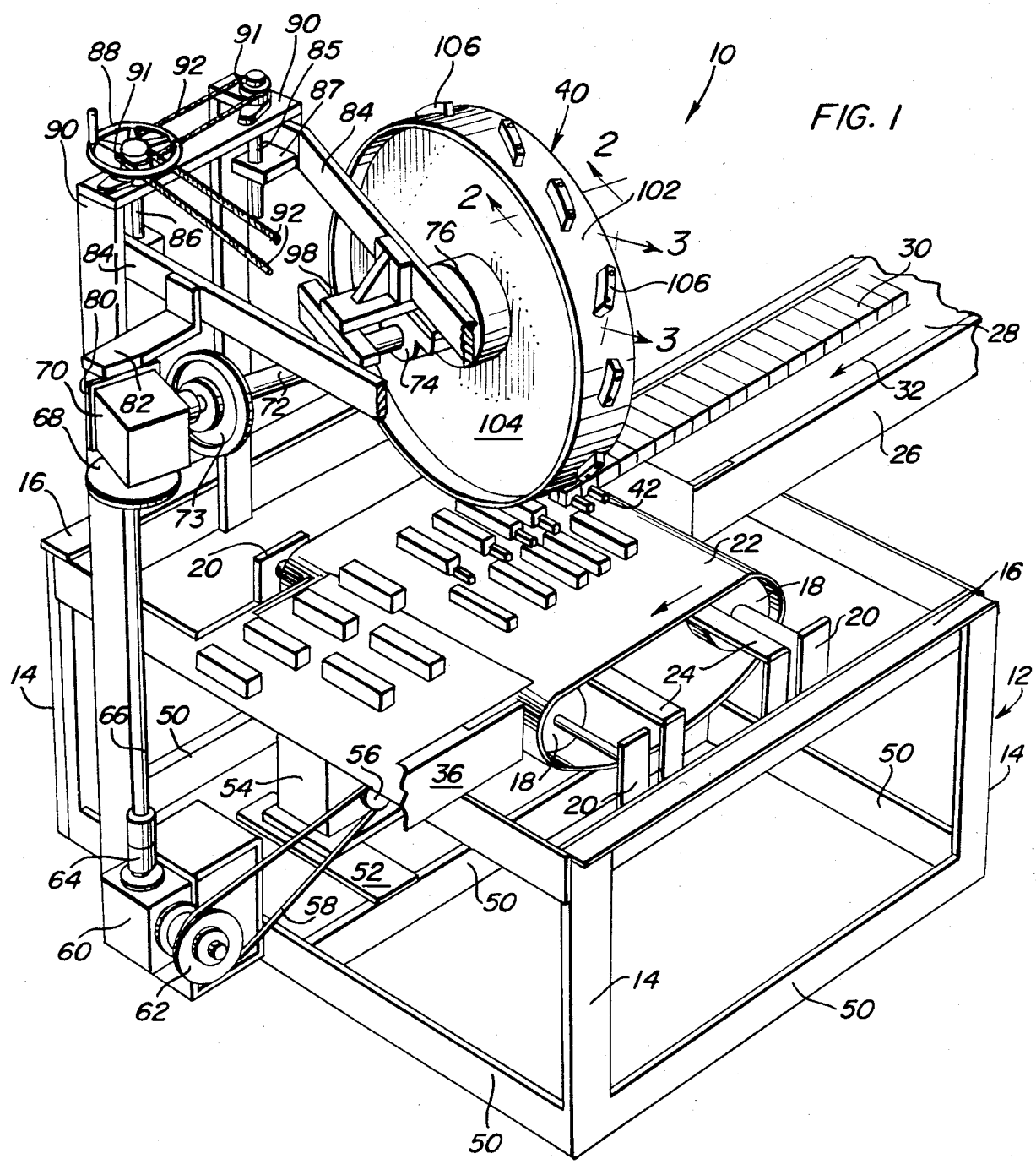
FIG. 1
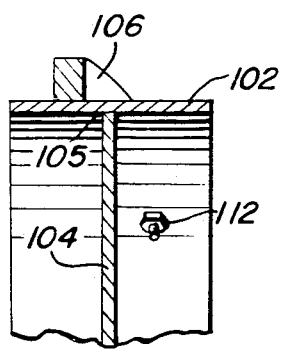
FIG. 2
FIG. 3

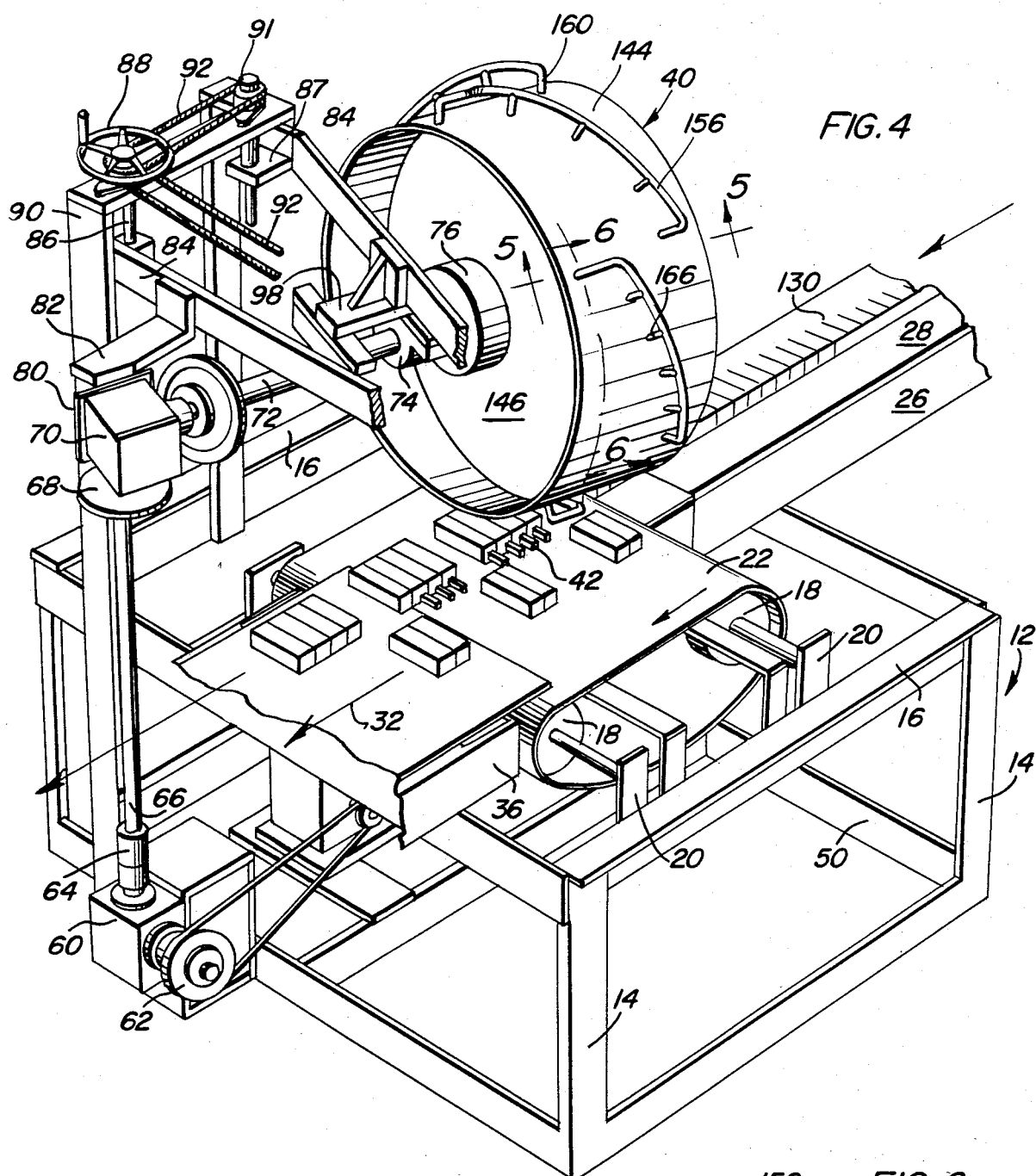
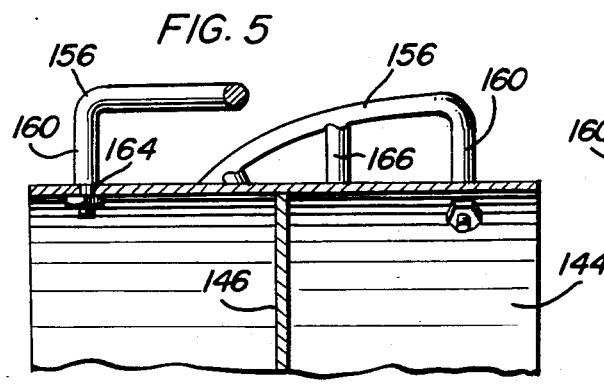
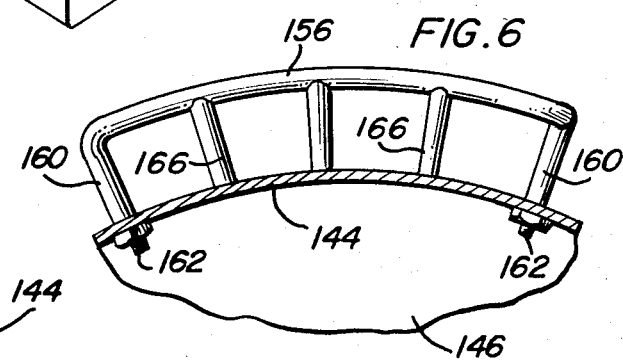

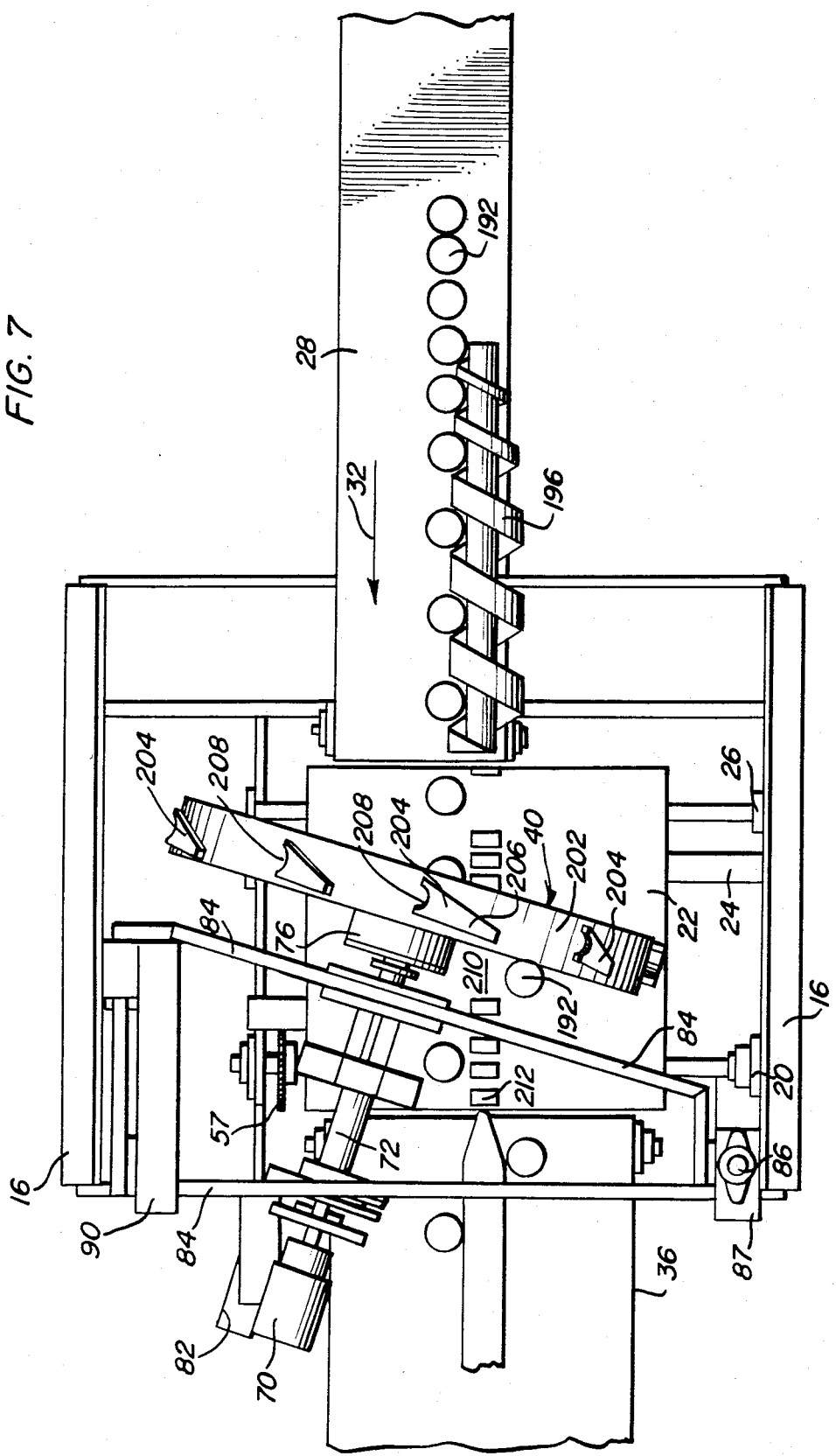

PRODUCT CONVEYOR LANE DIVIDER

BACKGROUND OF THE INVENTION

The present invention relates to a product conveyor lane divider for products fed from a product infeed conveyor onto a separator conveyor in single file or in a single lane which cooperates with a lane divider wheel having members thereon for selectively moving certain products, either single products or groups of products, from the single lane to an adjacent lane. The lugs on the divider wheel and spaced and arranged to accomplish such flexibility in use. Also an angle drive mechanism provides for reorienting the lane divider wheel with its wheel lugs so that there is variation of the division of the product, speed and number of products to be transferred from one lane to another. Also within the purview of the present invention, the infeed conveyor is associated with a product spacing auger to separate round products such as cans, tubs or jars and accordingly time them properly for feed onto the separator conveyor for engagement by the lane divider wheel and its lugs.

Basically, the invention provides for continuous motion of the product conveyor lane divider at relative high speed and which keeps the products under control and in proper orientation through the lane dividing operation. The apparatus displaces one or more cartons or products at a time. The separating wheel can be varied according to speed or rpm, size, orientation angle with respect to the product lane, size of the lugs, which may vary in width, length and position angle on the wheel. These dimensions and sizes as well as angles will vary with the size of the product and the rate of product infeed, and variation is also accomplished by having the lugs already positioned on a wheel and by mere replacement of the wheel with the variance of lug spacings and sizes of another wheel to accommodate different products to provide for versatility of the machine. Thus, different lug placements and sizes provide for alternative separation arrangements within the purview of the present invention, and thus various sizes, angles of approach or orientation of the divider wheel and placement of the lugs on the divider wheel provide for many variations depending on the desirable distribution of products according to size, number and the like. Also within the purview of the present invention, the separator conveyor may have a flighted lane separator structures disposed throughout thus defining a space between the two product lanes.

DESCRIPTION OF THE PRIOR ART

The following U.S. patents relate in some respect to this invention:

U.S. Pat. No. 2,109,148, G. W. Gwinn;
U.S. Pat. No. 2,115,255, E. David et al;
U.S. Pat. No. 3,058,570, J. A. Hansen;
U.S. Pat. No. 3,244,266, A. T. Zappia et al;
U.S. Pat. No. 4,057,138, E. A. Grebe.

The patent to David discloses the transfer of articles from one conveyor to another and the Zappia patent discloses apparatus for moving an element step-by-step across a conveyor. The patent to Gwynn and the other patents disclose various apparatus of interest such as receiving moving articles and dispensing them into a different predetermined path. None of these patents whether taken singly or in combination bears upon any claims of the invention of the present application.

SUMMARY OF THE INVENTION

An object and feature of the present invention is to provide a product conveyor lane divider apparatus for products oriented in a single lane on an infeed conveyor are transferred onto a separator conveyor which cooperates with a product lane divider wheel having lugs for selectively distributing various quantities of products into more than one lane of product.

A further object of the present invention is to provide a lane divider apparatus having an infeed of product provided with a timing screw or auger for separating round products such as cans, tubs or jars and accordingly timing them properly into a lane divider wheel so that more than one product lane can be formed.

A further object and advantage of the present invention is to provide a product lane divider wheel and accompanying replaceable lug elements thereon so that various sizes, numbers and groups of products can be formed and discharged from the separator conveyor into at least two lanes.

An additional and further object of the present invention is to provide an angle mechanism for a product lane divider wheel or to replace wheel lugs so that different angles thereof are provided, all of which may accordingly provide for product distribution into more than one lane and in which the rpm of the divider wheel, the angle of the divider wheel, and the number of items on the infeed conveyor may all be accordingly adjusted within reasonable values.

Yet still another object of the present invention is to provide a lane divider apparatus simple in construction and adjustment together with ease of assembly and economy of cost not heretofore available or known in the art.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a product conveyor lane divider apparatus illustrating one preferred embodiment of the present invention.

FIG. 2 is an enlarged sectional view taken along lines 2—2 of FIG. 1.

FIG. 3 is an enlarged sectional view taken along lines 3—3 of FIG. 1.

FIG. 4 is a perspective view of another embodiment of the present invention.

FIG. 5 is an enlarged sectional view taken along lines 5—5 of FIG. 4.

FIG. 6 is an enlarged sectional view taken along lines 6—6 of FIG. 4.

FIG. 7 is a top view of a further embodiment of the present invention in which the lugs are varied on the separating wheel to accommodate separation of cylindrical products, which are separated in the infeed line by an auger device.

DESCRIPTION OF THE PREFERRED EMBODIMENTS

Referring now to the drawings there is shown a product conveyor lane divider 10 having a support frame 12 including legs 14 and a support bar 16 for mounting a pair of rollers 18 rotatably mounted from members 20. The rollers 18 mount a separator conveyor 22 in the form of an endless belt having support bars 24 which extend under the upper flight of endless conveyor 22 as shown.

A product infeed conveyor 26 contains an endless conveyor including a belt or conveyor element 28 and which provides an entering lane of products 30 arranged in single file which move in the direction shown by arrow 32 onto the endless conveyor 22. A product discharge conveyor 36 receives products 30 from the separator conveyor 22 with the products 30 having been separated into at least two laterally spaced lanes by a rotary dividing wheel 40 positioned in overlying relation to the separating conveyor 22.

The support frame 12 is provided with base members 50, at least a pair of which provide a support surface 52 for a main drive 54 and an associated reducer drive shaft 56 coupled by a drive member 58 which may be either a chain, a V-shaped belt, and the like, coupled to an angle drive mechanism 60 by means of a drive pulley 62 connected to the belt 58. Similarly, the main drive 54 provides a drive coupling to a pulley or sprocket 57 (see FIG. 7) for driving one of the pair of rollers 18 referred to above. The angle drive mechanism 60 converts horizontal rotary motion to vertical rotary motion and by means of coupling 64 drives spline shaft 66 which in turn is connected to rotating plate 68 coupled to an angle drive mechanism 70. The angle drive mechanism 70 converts the vertical rotation of the spline shaft 66 to horizontal rotation of a shaft 72 journaled in bearings 74 and having its end coupled to and driving the lane divider wheel 40 mounted from a hub 76. The spline shaft 66 may slide longitudinally into and out of the coupling 64 and turns synchronously with it or the spline shaft 66 may be telescopic. The angle drive mechanism 70 is supported by a support plate 80 and angle member 82 supported in turn from an adjustment frame 84 which journals the shaft 72. The shape of the frame 84 is best seen in FIG. 7 and the frame 84 is capable of adjustment vertically by threaded shafts 86 that thread through brackets 87 on a frame 90 extending above the support frame 12. An adjustment crank 88 is attached to one threaded shaft 88 and these three shafts are interconnected by sprocket gears 91 and chains 92 for raising or lowering the adjustment frame 84. Thus as the adjustment frame 84 is adjusted, the lane divider wheel 40 is adjusted to a desired position depending on the height of the products 30.

While FIGS. 1 and 4 do not show the adjustment frame 84 in its entirety, the adjustment frame 84 is shown in FIG. 7 and the threaded shaft 86 distal from the crank 88 is coupled to the other shafts 86 by the chain 92.

The shaft 72 may be provided with a flanged coupling 73 which may include structure to enable angular adjustment of the lane divider wheel 40 in relation to the conveyor element 28 and the lane of products. The shaft 72 is supported from the adjustment frame 84 by the angle member 82 described above, the bearings 74 and a support frame member 98.

The lane divider wheel 40 is constructed to have a cylindrical surface 102 welded to a central disc 104 by weld connections 105 shown in FIG. 2. Spaced at predetermined positions along the peripheral cylindrical surface 102 are lane divider wheel lugs 106 angularly oriented on the surface 102 and oriented so that the wheel 40 does not engage the product 30 but is at an adjusted height determined by adjustment crank 88 so that the wheel lugs 106 engage predetermined ones of the products 30 and thus form separate lanes of products 30. The conveyor 22 is provided with lane separator elements or projections 42 arranged so that when one product 30 is displaced laterally by the wheel lug 106, the adjacent products do not move laterally since the projections prevent such movement by engaging any adjacent product 30 which tries to move laterally with the displaced product 30 due to friction or the like.

The main drive 54 determines the rate of rotation of the divider wheel 40 and the speed of the endless belt 22. The spacing of the lugs 106 upon the wheel 40, the angular orientation of the lugs 106, the length of the lugs 106, and the size of the products 30 all contribute to spacing and the distribution of the products in the separate product lanes. The lugs 106 therefore are accurately contoured for engaging in an arcuate or canted relation with the cylindrical surface 102, as shown in FIGS. 1, 2 and 3, and there are openings or holes in the cylindrical surface 102 and in the lugs 106 so that bolts 110 pass therethrough when they are in mating relation and are secured in place by a nut 112 tightened on each bolt 110. The lugs 106 may have alternate ones thereof removed from the wheel 40 and in this way a different distribution of products 30 is achieved, and other variations similarly are suggested within the purview of the structural cooperation of the several components of the assembly. Also, the diameter of the wheel 40 and the number of lugs on the wheel may vary according to the products 30 and according to the arrangement of product in the infeed lane. The lane divider wheel lugs 106 can be of various consistent lengths as desired in order to distribute larger quantities of product 30 into each of the lanes. While it is only partially exemplary from the drawings, the angle of lane divider wheel 40 with respect to the arrow 32 may be adjusted or varied accordingly to the type of products 30, the angle of the wheel lugs 106 on the wheel 40, and the speed and the number of items or products to be transferred from one lane to another.

In FIGS. 4–6, a similar arrangement of a lane divider assembly is shown for dividing cartons, boxes and various regular prism-shaped products from one lane into a plurality of lanes while on the endless conveyor 22. This assembly includes a differently configured lane divider wheel cylindrical surface 144 which is of a wider dimension and similarly constructed about a central disc 146. In FIGS. 4–6, the cylindrical surface 144 is provided with series of symmetrically arranged wire or rod-formed lugs 156 formed of a length of rod with end portions or terminal elements 160 contoured or turned angularly to have ends 162 terminating in a threaded portion passing through apertures 164 and engaged by threaded nuts for holding the assemblage onto the cylindrical surface 144. Intermediate the terminal elements 160, there is an intermediate set of stanchions 166 for interposing support between the lugs 156 and the cylindrical surface 144. This arrangement of lugs illustrated in FIGS. 4–6 together with the angle of the wheel lugs 156, the orientation of the products 30, and the speed and number of items to be transferred from one lane to another are arranged so that an appropriate distribution of products is achieved into the lines of products discharged from conveyor 22.

In the form of the invention illustrated in FIG. 7, a conveyor element 28 is shown advancing products 192 toward the endless conveyor 22 in which the products 192 are initially in close spaced relation moving in the direction of arrow 32. The products 192 are short cylindrical cans or the like and are engaged by a helical screw auger 196. The auger 196 is journaled and driven in any suitable manner and the external periphery of the flight tapers toward the end remote from the divider wheel 40. The auger 196 engages and separates round products 192 such as containers for feeding the products to conveyor 22 in spaced relation. This embodiment of the divider wheel 40 includes a cylindrical surface 202 with lugs 204 secured thereto in circumferentially spaced relation with each lug being angularly related to the surface 202 and includes tapering side edges 206 and an arcuate concave end edge 208 so that the products 192 are moved through space 210 between groups of projections 212 on the endless conveyor 22 so that there is a displacement of every other product 192 from the original lane to a displaced lane. By arrangement of the lugs 204 on the wheel 40, the dividing wheel can accommodate different sizes of products 192 to be separated.

The various arrangements show that the structure and placement of lugs on the dividing wheel 40 will enable the transfer of one, two or more products from a single infeed lane to a second lane in a regular pattern with the sizes, angles, and placement of the lugs on the dividing wheel providing diversity within these variations depending on the predetermined distribution of products that is desired.

The dividing wheel can be thus varied to accommodate separation of different products by varying the size of the lugs in width, length and its position angle on the wheel. All of these sizes and angles will vary with the size of the products. This can be accomplished by having these lugs already positioned on separate wheels and then by merely replacing one wheel with another, the variance in the lug spacings and sizes are quickly made to accommodate the different products.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Product separator and lane divider apparatus comprising a conveyor means coupled to a drive means, the conveyor means receiving a single infeed lane of products from a product infeed conveyor onto a conveyor surface of the conveyor means, rotatable wheel means positioned above the conveyor surface, the wheel means having a cylindrical surface mounting thereon at least one abutment means for cyclically engaging with predetermined ones or groups of the lane of products on the conveyor surface for pushing said ones or groups across the conveyor surface from the single lane on the conveyor surface to an adjacent laterally displaced lane thereon distinct from said single lane, and lane separator projections mounted on the conveyor means in a lengthwise array projecting from the conveyor surface between the infeed lane and the adjacent lane for engaging alternate products in the single lane between said predetermined ones or groups of products to prevent the alternate products being transferred by said wheel means to the adjacent lane.

2. The invention of claim 1 wherein the wheel means has its axis mounted at an angle with respect to the path of movement of the lane of products.

3. The invention of claim 1 wherein the abutment means is of a determined length and width and taken together with the number of abutment means on the wheel means and the size of the products, various quantities of products can be distributed from the lane of products to the adjacent lane of products.

4. The invention of claim 1 wherein means are provided to selectively raise and lower the position of the wheel means so that the abutment means adjustably engage the products in the lane of product.

5. The invention of claim 1 wherein the abutment means is a block element contoured to be mounted on a cylindrical surface of the wheel means.

6. The invention of claim 1 wherein the abutment means is a block having a concave recess for engaging convex-shaped products contoured to be mounted on a cylindrical surface of the wheel means.

7. The invention of claim 1 wherein the abutment means is a rod means mounted on a cylindrical surface of the wheel means.

8. The invention of claim 1 wherein the wheel means and abutment means are replaceable to provide varied sizes of abutment means including width, length and its position and angular orientation on the wheel means depending on the size of the products, the characteristics of the products, and number of products to be transferred into the adjacent lane.

9. The invention of claim 1 wherein the wheel means and abutment means are variously sized and arranged so a wheel means and its abutment means are replaceable with other wheel means with abutment means with variances of spacings and sizes of abutment means to accommodate different products and their sizes.

10. The invention of claim 1 wherein the wheel means with the abutment means are positioned on a wheel having the cylindrical surface so that the wheel means provides transfer of a given number of product to the adjacent lane and leave another given number of product in the infeed lane.

11. The invention of claim 1 wherein a timing means is provided for the product infeed conveyor to separate products in the single lane as they approach the conveyor means and thereby appropriately time the product for engagement with the wheel means and its abutment means.

12. The invention of claim 11 wherein the timing means is an auger.

* * * * *